March 1, 1960 J. GARDBERG 2,927,282

OSCILLATOR AND FILTER CIRCUITS

Filed April 24, 1958

INVENTOR

Joseph Gardberg

United States Patent Office 2,927,282

Patented Mar. 1, 1960

2,927,282

OSCILLATOR AND FILTER CIRCUITS

Joseph Gardberg, Chicago, Ill.

Application April 24, 1958, Serial No. 730,591

5 Claims. (Cl. 331—142)

This invention relates to oscillator and filter circuits and more particularly to resistance-capacitance oscillator and filter circuits, the amplitude and frequency of which are highly stabilized.

Resistance-capacitance oscillators, that is, those tuned by a resistance-capacitance network, and tuned amplifiers utilizing resistance-capacitance networks are well known and have taken many forms. In all such circuits contemplated heretofore, a resistance-capacitance network is coupled from an output electrode of an amplifier to an input electrode thereof through a coupling capacitor. With such a capacitor in the circuit, the direct-current operating point of the amplifier can drift with changes in factors such as the supply voltages and the characteristics of the amplifier. With respect to changes in amplifier characteristics, a change in transconductance of a vacuum tube, brought about by, for example, deterioration of the filament or the cathode, can cause variations in the direct-current operating point of the amplifier tube. Where transistors are used as the amplifier in prior art, capacity-coupled circuits, changes in the operating point can be brought about by temperature changes which affect the collector current thereof, thereby causing the improper operation of the circuit. Further, since the coupling capacitor effects a phase shift through the network, this capacitor must be very large. Even with a large coupling capacitor, its effect on the characteristics of the circuit at low frequencies is still extremely deleterious.

An object of this invention is to provide new and improved oscillator and filter circuits.

A further object of the invention is to provide a new and improved resistance-capacitance oscillator and filter circuits having improved amplitude and frequency stability compared to such circuits which have been devised heretofore.

A still further object of the invention is to provide oscillator and filter circuits wherein the direct-current operating points of amplitude therein are maintained constant despite variations in supply voltages or changes in characteristics of the amplifiers.

With these and other objects in view, an electrical circuit embodying the features of the present invention may include an amplifier having an input electrode and an output electrode, a frequency-selective circuit including a predetermined amount of resistance, direct-current-coupling means including the resistance connecting the output to the input electrode, and means including the resistance in the frequency-selective circuit for providing bias to the input electrode of the amplifier.

These and other objects of the invention will become apparent upon consideration of the following, detailed description of specific embodiments thereof, when taken in conjunction with the accompanying drawings, wherein.

Figure 1:
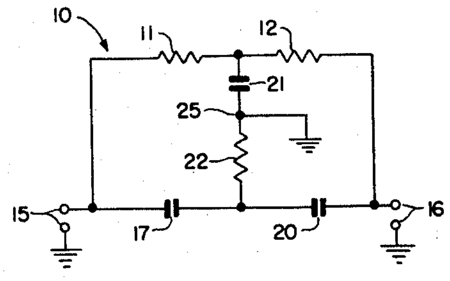
Fig. 1 is a schematic circuit diagram of a parallel-T, resistance-capacitance network used to illustrate the invention and exemplifying prior art.
Figure 2:
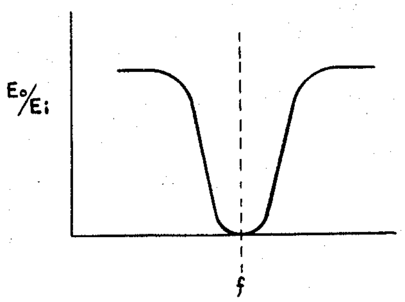
Fig. 2 is a characteristic curve of the parallel-T network shown in Fig. 1.

Referring now to the drawings, and more particularly to Fig. 1, there is illustrated a so-called parallel-T network, designated generally by the numeral 10. The parallel-T network 10 includes two serially-connected resistors 11 and 12 which are connected between input terminals 15—15 and output terminals 16—16. Two serially-connected capacitors 17 and 20 are connected across the resistors 11 and 12. A third capacitor 21 and a third resistor 22 are connected in series across junction points between the resistors 11 and 12 and the capacitors 17 and 20, respectively. A junction point 25, between the capacitor 21 and the resistor 22, is connected to a common, ground potential. Many analyses of the parallel-T network shown in Fig. 1 have been made, and such a network having a finite generator resistance and terminated in a resistive load has been analyzed in an article by L. C. Cowles, entitled "The Parallel-T Resistance-Capacitance Network" in the December, 1952, issue of the Procedure of the I.R.E., at page 1712. Generally speaking, however, if it is assumed that the value of the resistors 11 and 12 is R ohms, that of the resistor 22 is $R/2$ ohms, that the value of capacitors 17 and 20 is C farads and that of the capacitor 21 is 2C farads, then infinite attenuation is obtained at a frequency of $f$ cycles per second, where $f$ equals $\frac{1}{2}\pi RC$. Fig. 2 shows a typical, normalized frequency characteristic curve for a parallel-T network showing this relationship.

Networks of this type having characteristic curves such as that shown in Fig. 2 have been contemplated for use in oscillators and tuned amplifiers. However, in each such case, an output electrode of an amplifier is connected to the network input terminals, such as the terminals 15—15 of the parallel-T network 10, and the output terminals of the network, such as the terminals 16—16 of the network 10, are connected through a coupling capacitor to the input electrode of the amplifier. In these conventional circuits, assuming that a vacuum tube amplifier is used, a biasing resistor is connected between the cathode of the vacuum tube and ground. In this case, it can be seen that the bias of the amplifier stage is solely under the control of the biasing resistor in the cathode circuit. This means that the amplifier must have considerable gain and feed back in order to compensate for the effects of a variation in line voltage or a variation of the amplifier gain. Also, any change in gain or variation of the supply voltage to the amplifier changes the current of the device and, therefore, the effective transconductance of the amplifier. As a result of either of these changes, the direct-current operating point of the tube is varied. Furthermore, the usual capacitor which is connected in series with the parallel-T network between the amplifier output electrode and its input electrode must be made very large because of its effect on the phase shift through the network. Even with such a large capacitor, there is some phase shift at the higher frequencies and a large amount of phase shift at the low frequencies, so that such a capacitor has an extremely deleterious effect on the low-frequency characteristics of such a circuit.

Figure 3:
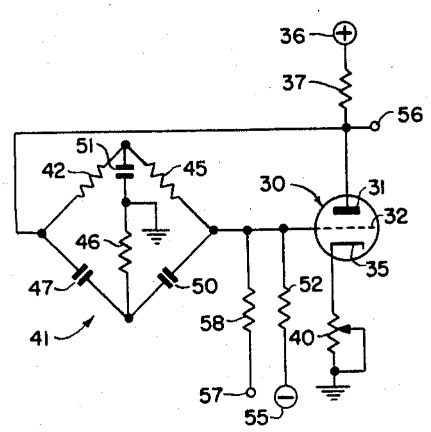
Fig. 3 is a schematic circuit diagram illustrating certain features of the present invention.

A feature of the present invention improves the operation of parallel-T oscillators or filter circuits in that the effects on the direct-current operating point of line voltage variation and changes in characteristics of the amplifier are minimized by using the serially-connected resistors, such as the resistors 11 and 12 of Fig. 1, as a portion of a direct-current voltage divider which supplies input circuit bias to the amplifier. Referring now to Fig. 3, one basic form of the invention is shown therein. In this figure, an amplifier tube 30 includes an anode 31, a control grid 32 and a cathode 35. The anode 31 is connected to a positive source 36 of potential through a resistor 37, and the cathode 35 is connected to a common, ground potential through a variable resistor 40. A parallel-T network, designated generally by the numeral 41, and including resistors 42, 45 and 46 and capacitors 47, 50 and 51, is connected between the anode 31 of the amplifier 30 and the control grid 32 thereof in a direct-current circuit. A resistor 52 is connected to a negative potential source 55, and the resistor 52 forms a direct-current voltage divider with the resistors 42 and 45 in the parallel-T network 41.

The circuit shown in Fig. 3 can be utilized as either an oscillator or a filter circuit. As mentioned hereinabove, a parallel-T network such as the parallel-T network 41 will provide an infinite attenuation at a predetermined, single frequency. At this predetermined frequency, a regenerative path will be established in the feed-back loop between the anode 31 of the amplifier 31 and the control grid 32 thereof. Voltages at all other frequencies at the anode 31 cause degeneration in this path. Also, it will be noted that the cathode resistor 40 will also provide degeneration for the amplifier 30. In order for the circuit shown in Fig. 3 to operate as an oscillator, the cathode resistor 40 is chosen so that the degeneration caused thereby is less than the regeneration in the feed-back loop at the particular, predetermined frequency to which the parallel-T network 41 is tuned. With the effect of degeneration caused by the cathode resistor 40 less than the effect of the regeneration in the feed-back loop at the frequency $f$, the circuit of Fig. 3 will oscillate, and such oscillations are applied to an output terminal 56.

With the invention as shown in Fig. 3, the effects of line voltage variation and changes in the gain of the amplifier 41 are minimized, and, for all practical purposes, rendered negligible. Should, for example, the line voltage as illustrated by the positive source 36 of potential increase, the potential of the anode 31 will likewise increase. This increased anode potential raises the input bias of the amplifier 30 to cause more current to flow therein, and thereby tends to decrease the anode potential of the amplifier. Thus, with the embodiment of the invention shown in Fig. 3, the direct-current operating point of the amplifier 30 tends to be self regulated, and, as most amplifiers tend to have a mutual conductance which is a function of the current flow therethrough, the gain of the stage is more nearly constant with this circuit. All of these advantages accrue by connecting a frequency-selective resistance-capacitance network, such as the parallel-T network 41, in a direct-current-coupled circuit between an output electrode of an amplifier and the input electrode thereof and by controlling input bias by the feed-back potential.

It can be seen, therefore, that the elimination of the usual capacitance coupling in such a circuit, has resulted not only in the elimination of the inherent phase shift in the circuit caused thereby, but also in an extremely stable circuit from the standpoint of amplitude and frequency, and one which is substantially unaffected by variations in line voltage and in amplifier transconductance. Another advantage results by means of the invention since the effective life of an amplifier, such as the amplifier 30, is increased greatly when used in a circuit such as the circuit shown in Fig. 3. This results since a decrease in amplifier gain, caused by a change in the transconductance thereof, is compensated due to the change in input bias which results from the change in gain. Consequently, the direct-current operating point is maintained in deteriorated tubes which have had to be replaced when used in prior art circuits.

As stated hereinabove, with the circuit shown in Fig. 3, if the regeneration caused by the feed back circuit, including the parallel-T network 41 and at the frequency to which the network is tuned, is greater than the degeneration caused by the resistor 40 connected to the cathode 35, the circuit will function as an oscillator. By an extremely simple change, the circuit shown in Fig. 3 can be utilized as a finely-tuned amplifier or filter. All that is necessary is that the resistance of the variable resistor 40 be increased so that the degeneration caused thereby is greater than the regeneration in the feed-back loop at the frequency $f$. With this change, when signals, including a plurality of frequencies and including the frequency $f$, are applied to an input terminal 57 and across a resistor 53 to the control grid 32, a signal having only the frequency $f$ will appear at the output terminal 56. The increased degeneration caused by the increased value of the resistor 40 will prevent oscillation of the circuit, and the characteristics of the parallel-T network 41 will cause attenuation of all signals except the signal at the frequency $f$. Consequently, with this minor change of components, the circuit shown in Fig. 3 can be used as a very effective and finely-tuned filter circuit. In order to obtain filters for various frequencies, it is only necessary to change the components of the parallel-T network and, if necessary, the value of the resistor 40 in order to provide degeneration that is greater than the regeneration in the feed-back loop which includes the parallel-T network 41.

Figure 4:
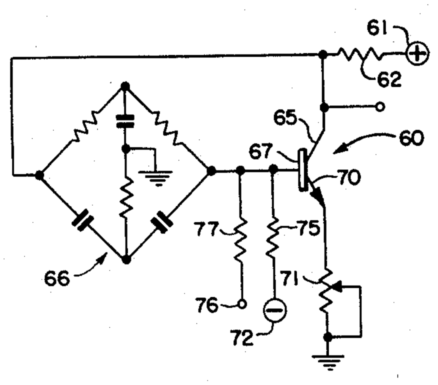
Fig. 4 is a schematic circuit diagram of a modification of the circuit shown in Fig. 3.

A modified version of the circuit shown in Fig. 3 is shown in Fig. 4, wherein a transistor 60 has been substituted for the vacuum-tube amplifier 30. Except for different values of operating potentials and of components for producing such potentials, the operation of the circuit shown in Fig. 4 is substantially similar to that shown in Fig. 3. In Fig. 4, a positive source 61 of potential is connected through a resistor 62 to a collector 65 of the transistor 60 to provide the proper operating potential for the transistor. A parallel-T network 66 is connected between the collector 65 and a base 67 of the transistor 60 in a direct-current-coupled circuit. In this case, an output is taken from the transistor 60 from its collector 65, and an emitter 70 is connected through a variable resistor 71 to ground potential. The base 67 is connected to a negative biasing source 72 through a resistor 75. With the structure thus far described, the circuit shown in Fig. 4 will oscillate at the frequency to which the network 66 is tuned since, at this frequency, a regenerative path exists between the collector 65 and the base 67 of the transistor 60. In order for the circuit shown in Fig. 4 to operate as an oscillator, the resistor 71 in the circuit of the emitter 70 is adjusted so that the degeneration caused thereby is less than the regeneration in the collector-base feed-back loop at the frequency $f$ of the network 66. With this provision, the transistor 60 will oscillate at a frequency determined by the parallel-T network 66.

In order to utilize the circuit shown in Fig. 4 as a filter, the value of the resistor 71 is increased so that it provides degeneration which is greater than the regeneration in the feed-back loop at the frequency $f$ of the parallel-T network 66. Consequently, under these circumstances, the circuit shown in Fig. 4 will not oscillate, but will amplify any signal of a given frequency, determined by the frequency to which the parallel-T network 66 is tuned, which signal is applied to an input terminal 76 and across a resistor 77 to the base 67. It can be seen, then, that the circuit shown in Fig. 4 includes all of the advantages of the circuit shown in Fig. 3, and such advantages are derived by connecting a resistance-capacitance network, such as the parallel-T network 66, in a direct-current-coupled circuit between the output collector 65 of the transistor 60 and the input base 67 thereof. Then, using the resistive portion of the parallel-T network 66 and the resistor 75 as a voltage divider to provide input bias, the direct-current operating point of the transistor 60 will be maintained constant despite, for example, changes in temperature which affect the collector current and tend to shift the operating point.

Figure 5:
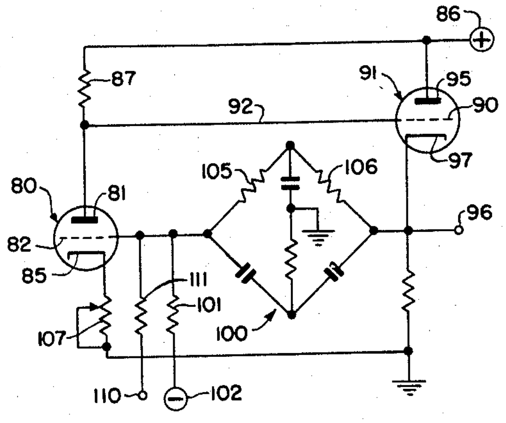
Fig. 5 is a schematic circuit diagram of an alternate embodiment of the present invention.

Fig. 5 shows an alternate embodiment of the invention, and shown therein is an oscillator or filter having its output connected to a cathode follower. Considering this circuit as an oscillator, an amplifier tube 80 includes an anode 81, a control grid 82 and a cathode 85. The anode 81 is connected to a positive source 86 through a resistor 87, and it is connected directly to an input control grid 90 of a cathode follower 91 over a lead 92. An anode 95 of the cathode follower 91 is connected to the positive source 86, and output signals are taken from an output terminal 96 which is connected to a cathode 97 of the cathode follower 91. Connected between the cathode 97 of the cathode follower 91 and the control grid 82 of the amplifier 80 is a parallel-T network, designated generally by the numeral 100. This network is similar to the networks 10, 41 and 66 shown in Figs. 1, 3 and 4, respectively, and it is tuned to a predetermined frequency at which the oscillator circuit is to oscillate.

A resistor 101, connected between the grid 82 of the amplifier tube 80 and a negative source 102 of potential, and resistors 105 and 106 in the parallel-T network 100 form a voltage divider which provides input bias for the amplifier tube 80. A variable cathode resistor 107 also provides bias for the amplifier tube 80, and, with the voltage divider including the resistors 101, 105 and 106 connected in a direct-current feed-back circuit for the amplifier 80, the bias of the amplifier 80 is not solely under control of the biasing resistor 107 in the cathode circuit thereof. Any change in gain of the amplifier 80 or variation of the supply source 36 changes the current in the device, and such a change is compensated by the direct-current-coupled circuit including the voltage divider between the anode 81 and the control grid 82 of the amplifier 80.

As in the previously-described embodiments, the parallel-T network 100 will attenuate all frequencies other than that to which it is tuned. Further, at this tuned frequency, the connection between the anode 81 and the control grid 82 of the amplifier 80, including the parallel-T network 100, is regenerative. The resistor 107, which provides degeneration for the amplifier 80, is adjusted so that such degeneration is less than the regeneration in the feed-back loop at the frequency $f$ of the network 100. Consequently, the circuit shown in Fig. 5 will oscillate at the frequency determined by the tuning of the parallel-T network 100. As in the case of the previously-described embodiments, the circuit shown in Fig. 5 can be used as a filter circuit by increasing the resistance of the variable resistor 107 to increase the degeneration caused thereby so that the circuit shown in Fig. 5 will not oscillate. Then, upon application to an input terminal 110 of a plurality of signals of different frequencies, including the frequency $f$ to which the parallel-T network 100 is tuned, across a resistor 111 and to the control grid 82 of the amplifier 80, only the frequency to which the parallel-T network 100 is tuned will appear at the cathode 97 of the cathode follower 91 and be applied to the output lead 96. Consequently, a finely-tuned filter is provided by this very simple alteration of the circuit shown in Fig. 5.

Figure 6:
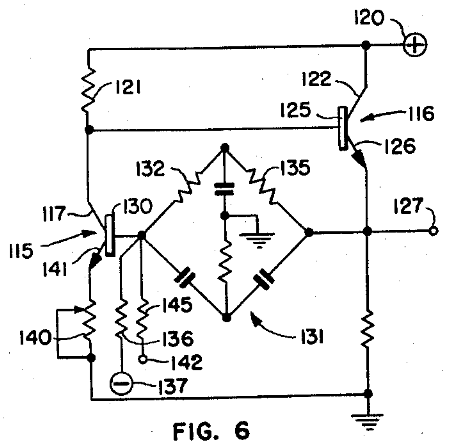
Fig. 6 is a schematic circuit diagram of a modification of the circuit shown in Fig. 5.

The circuit shown in Fig. 6 is a modified version of that shown in Fig. 5 in that a transistor amplifier 115 has been substituted for the amplifier tube 80, and an emitter-follower transistor 116 has been substituted for the cathode follower tube 91. A collector 117 of the transistor amplifier 115 is connected to a positive source 120 of operating potential through a resistor 121, and a collector 122 of the transistor 116 is connected directly to this source. Outputs of the transistor amplifier 115 are connected directly to an input base 125 of the transistor 116. An output is taken from an emitter 126 of the transistor 116, and this output is applied to an output terminal 127. The emitter-follower transistor 116 also forms a part of a feed-back loop to a base 130 of the transistor amplifier 115. This feed-back loop includes a parallel-T network 131, including two serially-connected resistors 132 and 135. As in the previously-described embodiments, the parallel-T network 131 is tuned to a predetermined frequency ($f$), and the circuit shown in Fig. 6 is to oscillate at this frequency. A resistor 136, connected between the base 130 of the amplifier 115 and a negative source 137 of potential, forms a voltage divider with the resistors 132 and 135 in the parallel-T network 131. It can be seen, then, that a direct-current feed-back circuit for the transistor amplifier 115 is connected between the collector 117 and the base 130 thereof, and this circuit includes the emitter-follower transistor 116 and the resistors 132 and 135 in the parallel-T network 131. Further, a voltage divider is formed by the resistors 132 and 135 and the resistor 136 to provide an input bias for the transistor amplifier 115 to maintain the operating point of this transistor constant. A further bias for this transistor is provided by a variable resistor 140 which is connected to an emitter 141 of the transistor 115.

As in the previously-described embodiments, the connection between the collector 117 of the transistor 115 and the base 130 thereof and including the parallel-T network 131 is regenerative at the frequency to which the network is tuned, and the connection from the emitter 141 and across the resistor 140 is degenerative. Consequently, in order for the circuit shown in Fig. 6 to oscillate, the variable resistor 140 is chosen so that the degeneration caused thereby is less than the regeneration in the feed-back loop at the tuned frequency $f$ of the network 131. Under these circumstances, the circuit shown in Fig. 6 will oscillate at a frequency determined by the tuning of the parallel-T network 131. When it is desired to operate the circuit shown in Fig. 6 as a filter, the resistance of the resistor 140 is increased so that the degeneration caused thereby is greater than the regeneration in the feed-back loop at the frequency $f$. Consequently, the circuit shown in Fig. 6 will not oscillate, but when signals, including a plurality of frequencies and that to which the parallel-T network 131 is tuned, are applied to an input terminal 142, across a resistor 145 and to the base 130 of the transistor 115, this circuit will pass a signal at only the frequency to which the parallel-T network 131 is tuned. Consequently, with such a filter circuit, an output signal is taken from the output terminal 127, and this output signal will include only the frequency to which the parallel-T network is tuned. It can be seen, then, that a finely-tuned filter is provided by the circuit shown in Fig. 6 by a very simple alteration of the components thereof.

It will be understood that the above-described embodiments are merely illustrative of the principles of the invention and that many modifications may be made thereto without departing from the spirit and scope of the invention.

What is claimed is:

1. An oscillator which comprises an amplifier tube having an anode, a cathode, and a control electrode, a frequency-selective resistance-capacitance network including a predetermined amount of series resistance between its input and output and designed to provide infinite attenuation at a predetermined frequency at which the oscillator is to operate, direct-current-coupling means for connecting the amplifier anode to the network input and for connecting the network output to the control electrode of the amplifier, a resistor connected to the control electrode for forming a voltage divider with the series resistance of the network in order to apply a predetermined amount of regenerative feed-back to the control electrode at the predetermined frequency of the network, and a second resistor connected to the amplifier cathode for providing a predetermined amount of degeneration to the amplifier tube.

2. A circuit for passing an input signal of a predetermined frequency, which comprises an amplifier tube having an anode, a cathode and a control electrode, a parallel-T network including a pair of serially-connected resistors tuned to the predetermined frequency, direct-current-coupling means including the serially-connected resistors of the network connected between the amplifier anode and control electrode to provide a regenerative feed-back circuit therebetween at the predetermined frequency, means connected to the amplifier cathode for providing degeneration thereto in excess of the regeneration being applied to the control electrode, and means for applying the signal to the control electrode of the amplifier.

3. A frequency-selective circuit which comprises an amplifier having an anode, a cathode and a control grid, a cathode follower having a cathode and a control grid, means for coupling the anode of the amplifier directly to the control grid of the cathode follower, a frequency-selective resistance-capacitance network including a predetermined amount of series resistance and designed to provide infinite attenuation at the predetermined frequency at which the circuit is to operate, means for connecting the series resistance of the network in a direct-current circuit between the cathode of the cathode follower and the control grid of the amplifier, a third resistor connected between the control grid of the amplifier and a negative potential, and a fourth resistor connected between the cathode of the amplifier and the predetermined potential, the direct-current circuit between the anode and the control grid of the amplifier providing a regenerative circuit for the amplifier at the predetermined frequency, the series resistance of the network and the third resistor providing input circuit bias for the amplifier and the fourth resistor providing a degenerative circuit for the amplifier and a further bias therefor.

4. An oscillator for providing oscillatory energy at a predetermined frequency, which comprises a transistor having a collector, an emitter and a base, a parallel-T network having input and output terminals and a predetermined amount of resistance therebetween and tuned to a frequency at which the oscillator is to operate, means for connecting the input and the output terminals of the network between the collector and the base to provide a direct-current regenerative circuit for the transistor at the operating frequency, a first resistor connected between the base and a negative potential for forming a voltage divider with the network predetermined resistance to provide input bias to the base of the transistor, and a second resistor connected between the emitter of the transistor and a predetermined potential to provide a degenerative circuit for the amplifier, the effect of the regenerative circuit on the amplifier at the operating frequency designed to overcome the effect thereon of the degenerative circuit so that the amplifier oscillates at the frequency to which the parallel-T network is tuned.

5. A frequency-selective circuit which comprises a pair of transistors, each of which includes a collector, an emitter and a base, conductor means for connecting the collector of a first of the transistors directly to the base of the second transistor, a frequency-selective resistance-capacitance network including a predetermined amount of serially-connected direct-current resistance and tuned to a predetermined frequency, means including the direct-current resistance of the network for completing a direct-current path between the emitter of the second transistor and the base of the first transistor to provide a regenerative circuit for the first transistor at the predetermined frequency, biasing resistors connected to the base and to the emitter of the first transistor, the base biasing resistor forming a voltage divider with the direct-current resistance of the network and connected to a negative potential to provide a predetermined input bias for the first transistor, the emitter biasing resistor being connected to a predetermined potential to provide further bias for the first transistor and to provide a degenerative circuit therefor, and means connected to the emitter of the second transistor to withdraw an output from the circuit.

References Cited in the file of this patent

UNITED STATES PATENTS

| | | |
|---|---|---|
| 2,586,167 | Kamm | Feb. 19, 1952 |
| 2,764,643 | Sulzer | Sept. 25, 1956 |

FOREIGN PATENTS

| | | |
|---|---|---|
| 563,421 | Great Britain | Aug. 14, 1944 |